US008264956B2

(12) United States Patent
Ramankutty et al.

(10) Patent No.: US 8,264,956 B2
(45) Date of Patent: Sep. 11, 2012

(54) SERVICE REDUNDANCY IN WIRELESS NETWORKS

(75) Inventors: Rajesh Ramankutty, Nashua, NH (US); Kuntal Chowdhury, Andover, MA (US)

(73) Assignee: Cisco Technology, Inc., San Jose, CA (US)

( * ) Notice: Subject to any disclaimer, the term of this patent is extended or adjusted under 35 U.S.C. 154(b) by 290 days.

(21) Appl. No.: 12/715,275

(22) Filed: Mar. 1, 2010

(65) Prior Publication Data
US 2010/0220656 A1 Sep. 2, 2010

Related U.S. Application Data

(60) Provisional application No. 61/156,364, filed on Feb. 27, 2009.

(51) Int. Cl.
*H04L 1/00* (2006.01)
*H04L 12/26* (2006.01)
*H04W 4/00* (2009.01)

(52) U.S. Cl. .......................... 370/228; 370/338

(58) Field of Classification Search ............... 370/228, 370/328
See application file for complete search history.

(56) References Cited

U.S. PATENT DOCUMENTS

| 6,195,705 B1 | 2/2001 | Leung |
| 6,487,605 B1 | 11/2002 | Leung |
| 6,621,810 B1 | 9/2003 | Leung |
| 6,771,623 B2 | 8/2004 | Ton et al. |
| 6,788,204 B1 | 9/2004 | Ianelli et al. |
| 6,795,705 B1 | 9/2004 | Warrier et al. |
| 6,799,204 B1 | 9/2004 | Baba et al. |
| 7,080,151 B1 | 7/2006 | Borella et al. |
| 7,173,917 B1 | 2/2007 | Narayanan et al. |
| 7,227,863 B1 | 6/2007 | Leung et al. |
| 7,269,133 B2 | 9/2007 | Lu et al. |
| 7,340,168 B2 | 3/2008 | Giles et al. |
| 7,340,169 B2 | 3/2008 | Ovadia et al. |
| 7,457,882 B2 | 11/2008 | Stewart et al. |

(Continued)

FOREIGN PATENT DOCUMENTS
EP   1 783 979   5/2007
(Continued)

OTHER PUBLICATIONS

File History for U.S. Appl. No. 11/286,049 (218 pages).
(Continued)

*Primary Examiner* — Ronald Abelson
(74) *Attorney, Agent, or Firm* — Wilmer Cutler Pickering Hale and Dorr LLP

(57) ABSTRACT

This disclosure relates to an apparatus and method for providing service redundancy among devices in a communication network. The devices can be, for example, a mobility management entity (MME), a serving gateway (SGW), a PDN gateway (P-GW), a call session control function (CSCF), a SGSN, a GGSN, or any other device implemented on a chassis. The redundancy includes a geographic redundancy where the devices are remotely located from one another to prevent a service outage. The devices can provide redundancy to multiple other devices, such that one device serves as a backup to multiple other devices. The information used to provide service to a mobile node such as user equipment can be backed up on the redundancy device and the device can advertise the same routing information to the network so the network is unaware of any change.

23 Claims, 5 Drawing Sheets

U.S. PATENT DOCUMENTS

| | | |
|---|---|---|
| 7,657,260 B2 | 2/2010 | Meng |
| 7,827,307 B2 | 11/2010 | Lehrschall et al. |
| 2001/0021175 A1 | 9/2001 | Haverinen |
| 2002/0010865 A1 | 1/2002 | Fulton et al. |
| 2002/0067704 A1 | 6/2002 | Ton |
| 2002/0080752 A1 | 6/2002 | Johansson et al. |
| 2002/0165944 A1 | 11/2002 | Wisner et al. |
| 2003/0073439 A1 | 4/2003 | Wenzel et al. |
| 2003/0182433 A1 | 9/2003 | Kulkarni et al. |
| 2004/0066749 A1 | 4/2004 | Watanabe |
| 2004/0090941 A1 | 5/2004 | Faccin et al. |
| 2004/0095881 A1 | 5/2004 | Borella et al. |
| 2004/0202126 A1 | 10/2004 | Leung et al. |
| 2005/0207382 A1 | 9/2005 | Hirashima et al. |
| 2005/0207429 A1 | 9/2005 | Akita et al. |
| 2006/0174039 A1 | 8/2006 | Stewart et al. |
| 2007/0066273 A1 | 3/2007 | Laroia et al. |
| 2007/0066329 A1 | 3/2007 | Laroia et al. |
| 2007/0165516 A1 | 7/2007 | Xu et al. |
| 2007/0206563 A1* | 9/2007 | Silver et al. ............... 370/351 |
| 2007/0245167 A1 | 10/2007 | De La Cruz et al. |

FOREIGN PATENT DOCUMENTS

| | | |
|---|---|---|
| JP | 2001-236257 A | 8/2001 |
| WO | WO-00/45560 | 8/2000 |
| WO | WO-03/085540 | 10/2003 |
| WO | WO-03107698 A1 | 12/2003 |

OTHER PUBLICATIONS

File History for U.S. Appl. No. 11/286,050 (144 pages).
File History for U.S. Appl. No. 11/731,920 (299 pages).
International Search Report and Written Opinion issued for corresponding International Patent Application No. PCT/US2007/008302, Jul. 17, 2008 (9 pages).
International Search Report and Written Opinion issued for International Patent Application No. PCT/US2006/045256, Nov. 25, 2007 (6 pages).
International Search Report and Written Opinion issued for International Patent Application No. PCT/US2006/045326, Nov. 24, 2007 (6 pages).
"Service Gateway—RedBack SmartEdge 800", Falcon Communications Inc., www.falconcommunications.com/partners/redback3.htm, 2005 (9 pages).

* cited by examiner

SERVICE REDUNDANCY IN WIRELESS NETWORKS

CROSS-REFERENCE TO RELATED APPLICATIONS

This application claims benefit under 35 U.S.C. §119(e) of U.S. Provisional Patent Application No. 61/156,364, entitled "Service Redundancy in Wireless Networks," filed Feb. 27, 2009, and is hereby incorporated by reference herein in its entirety. This application is related to U.S. patent application Ser. No. 11/286,050, entitled "A Method for Providing Home Agent Geographic Redundancy via a Service Redundancy Protocol," filed Nov. 23, 2005, U.S. patent application Ser. No. 11/286,049, entitled "A Method for Providing Home Agent Geographic Redundancy," filed Nov. 23, 2005, and U.S. patent application Ser. No. 11/731,920, entitled "System and Method for Active Geographic Redundancy," filed Apr. 2, 2007, each of which is hereby incorporated by reference herein in its entirety.

FIELD OF THE DISCLOSURE

This disclosure relates to a system and method for providing service redundancy among devices in a communication network.

BACKGROUND

Wireless networks are telecommunications networks that use radio waves to carry information from one node in the network to one or more receiving nodes in the network. Wired communication can also be used in portions of a wireless network, such as between cells or access points. Cellular telephony is characterized by the use of radio cells that provide radio coverage for a geographic area, with multiple cells arranged to provide contiguous radio coverage over a larger area.

The first generation of wireless telephone technology used analog mobile phones in which analog information signals were transmitted. As technology progressed a second generation (2G) of wireless service was introduced. In 2G systems, digital information signals were used to modulate a carrier. These 2G technologies used time division multiplexed access (TDMA) or code division multiple access (CDMA) technologies to distinguish multiple users. Such networks that were upgraded to handle higher-speed packet data in networks referred to as 2.5G and 3G networks. The 3rd Generation Partnership Project (3GPP) and the 3rd Generation Partnership Project 2 (3GPP2) respectively developed the GSM/UMTS/HSDPA and cdmaOne/CDMA2000 technologies. The next evolution is 4G technology, which is referred to as long term evolution-system architecture evolution (LTE-SAE) and uses orthogonal frequency division multiple access (OFDMA) technology.

Other wireless protocols have also developed including WiFi, an implementation of various IEEE 802.11 protocols, WiMAX, an implementation of IEEE 802.16, and Hiper-MAN, which is based on an ETSI alternative to IEEE 802.16.

Wireless communication technologies are used in connection with many applications, including, for example, satellite communications systems, portable digital assistants (PDAs), laptop computers, and mobile devices (e.g., cellular telephones, user equipment). One benefit that users of such applications can obtain is the ability to connect to a network (e.g., the Internet) as long as the user is within range of such a wireless communication technology.

SUMMARY OF THE DISCLOSURE

This disclosure relates to an apparatus and method for providing service redundancy among devices in a communication network. The devices can be, for example, a mobility management entity (MME), a serving gateway (SGW), a packet data network (PDN) gateway (P-GW), a call session control function (CSCF), a SGSN, a GGSN, or any other device implemented on a chassis. The redundancy includes a geographic redundancy where the devices are remotely located from one another to prevent a service outage. The devices can provide redundancy to multiple other devices, such that one device serves as a backup to multiple other devices. The information used to provide service to a mobile node such as user equipment can be backed up on the redundancy device and the device can advertise the same routing information to the network so the network is unaware of any change. In a situation where more than one device fails, the redundant MME can advertise the routing information of each respective device that it is providing service redundancy for and handle the mobility management functions for all the existing mobile devices.

In some embodiments, a method of providing geographic redundancy from a MME implemented on a chassis to a plurality of remote mobility management entities (MME) is disclosed, the method including receiving, at the MME, a configuration message from a first remote MME, which is used by the MME to configure the MME to provide geographic redundancy to the first remote MME, receiving, at the MME, a configuration message from a second remote MME, which is used by the MME to configure the MME to provide geographic redundancy to the second remote MME, receiving, at the MME, from the first remote MME, backup information that corresponds to active sessions on the first remote MME, receiving, at the MME, from the second remote MME, backup information that corresponds to active sessions on the second remote MME, creating, at the MME, redundant sessions corresponding to the sessions on the first remote MME and the second remote MME using the backup information received from the first remote MME and the second remote MME, activating the redundant sessions on the MME for at least one of the first remote MME and the second remote MME when the MME detects a trigger from at least one of the first remote MME and the second remote MME, and exchanging control signaling at the MME with at least one eNodeB and at least one serving gateway (SGW), wherein the MME takes over providing evolved mobility management and evolved session management in place of the at least one of the first remote MME and the second remote MME using the activated redundant sessions.

In other embodiments, a mobility management entity (MME) that communicates with at least one remote MME to provide redundancy in case of failure is disclosed, the MME including a service redundancy protocol (SRP) manager of the MME that provides redundancy to a remote MME, and where the SRP manager is configured to read incoming and form outgoing SRP control messages exchanged with the remote MME, wherein the SRP messages received include backup information for sessions on the remote MME, a SRP session manager of the MME configured to communicate with the SRP manager to receive the backup information obtained from the remote MME and create redundant sessions that correspond to active sessions on the remote MME, wherein the redundant sessions are updated to allow the MME to activate the redundant sessions to provide MME functionality in place of the remote MME, and wherein the MME is configured to transmit control signaling to at least one eNodeB and at least one serving gateway (SGW) after a trigger is detected by the SRP manager and a switchover is initiated.

In yet other embodiments, a chassis that implements a mobility management entity (MME) function and communicates with at least one remote chassis that implements a second MME function is disclosed, the chassis including a service redundancy protocol (SRP) manager implemented by the chassis to provide redundancy to a plurality of remote chassis each implementing a MME, and where the SRP manager is configured to read incoming SRP control messages received from the plurality of remote chassis that include backup information on one of the plurality of remote chassis implementing a MME function, a SRP session manager implemented by the chassis and configured to communicate with the SRP manager to receive backup information obtained from at least one of the plurality of remote chassis and create redundant sessions that correspond to active sessions on the at least one of the plurality of remote chassis, wherein the redundant sessions are updated to allow the chassis to activate the redundant sessions to provide MME functionality in place of an MME function residing on one of the plurality of remote chassis, and a physical interface on the chassis configured to transmit control signaling from the MME function to at least one eNodeB and at least one serving gateway (SGW) after a trigger is detected by the SRP manager and a switchover is initiated.

DETAILED DESCRIPTION

Systems and methods of providing service redundancy in communication systems are disclosed in certain embodiments. Geographic Redundancy (GR) is an inter-chassis redundancy, where the chassis may implement one or more network entities such as a mobility management entity (MME), a packet data network gateway (PDN GW), or a serving gateway (SGW) for long term evolution (LTE) access. Service redundancy allows the services provided by a network entity to remain available even in the event of a failure of one of the network entities in the redundant group, which may be composed of two or more network entities. The network entities can be located in geographically separate areas to ensure that a network outage event in one geographic area does not cause subscriber services to be impacted in another area. The service redundancy can be provided by communicating information from a first member within the redundant group to a second member, which allows the second member to continue providing services to a mobile node or user equipment without interruption in the event of a failure or other issue with first member.

Figure 1:
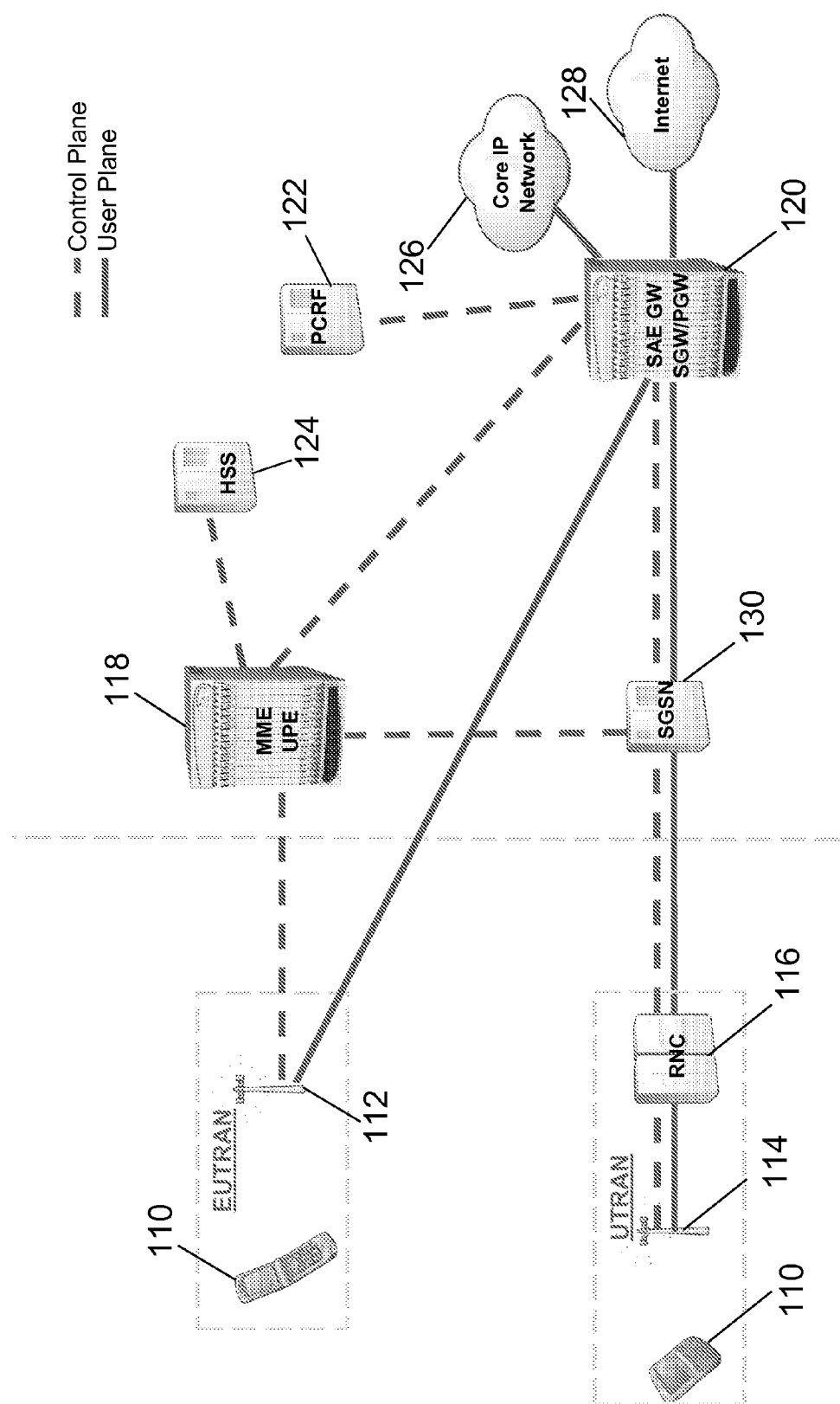
FIG. 1 illustrates a network diagram in accordance with certain embodiments.

FIG. 1 illustrates a network diagram in accordance with certain embodiments. FIG. 1 illustrates both a universal mobile telecommunication system (UMTS) release 8 network and a LTE network. The network diagram of FIG. 1 includes user equipment (UE) 110, an evolved nodeB (eNB) 112, a nodeB 114, a radio network controller (RNC) 116, a mobility management entity (MME)/user plane entity (UPE) 118, a system architecture evolution gateway (SAE GW) 120, a policy and charging rules function (PCRF) 122, home subscriber server (HSS) 124, core IP network 126, internet 128, and Serving General packet radio service Support Node (SGSN) 130. The MME 118, SAE GW 120, and SGSN 130 can be implemented in a gateway as described below. The SAE GW 120 can include a serving gateway (SGW) as well as a packet data network gateway (P-GW). In some embodiments, the SGW and P-GW can be implemented on separate network devices. The main component of the SAE architecture is the Evolved Packet Core (EPC), also known as SAE Core. The EPC includes the MME, SGW and P-GW components.

MME 118 can be a control-node for the LTE access network. The MME 118 is responsible for UE 110 tracking and paging procedures including retransmissions. MME 118 handles the bearer activation/deactivation process and is also responsible for choosing the SGW for a UE 110 at the initial attach and at time of an intra-LTE handover. The MME 118 also authenticates the user by interacting with the HSS 124. The MME 118 also generates and allocates temporary identities to UEs and terminates Non-Access Stratum (NAS) signaling. The MME 118 checks the authorization of the UE 110 to camp on the service provider's Public Land Mobile Network (PLMN) and enforces UE roaming restrictions. The MME 118 is the termination point in the network for ciphering/integrity protection for NAS signaling and handles the security key management. Lawful interception of signaling is also supported by the MME 118. The MME also provides the control plane function for mobility between LTE and 2G/3G access networks with the S3 interface terminating at the MME 118 from the SGSN 130. The MME 118 also terminates the S6a interface towards the home HSS for roaming UEs.

The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN GW). For idle state UEs, the SGW terminates the down link data path and triggers paging when down link data arrives for the UE 110. The SGW manages and stores UE contexts, e.g. parameters of the IP bearer service and network internal routing information. The SGW also performs replication of the user traffic in case of lawful interception. The P-GW provides connectivity to the UE 110 to external packet data networks by being the point of exit and entry of traffic for the UE 110. A UE 110 may have simultaneous connectivity with more than one P-GW for accessing multiple packet data networks. The P-GW performs policy enforcement, packet filtering for each user, charging support, lawful interception, and packet screening. The P-GW also provides an anchor for mobility between 3GPP and non-3GPP technologies such as WiMAX and 3GPP2 (CDMA 1X and EvDO).

Figure 2:
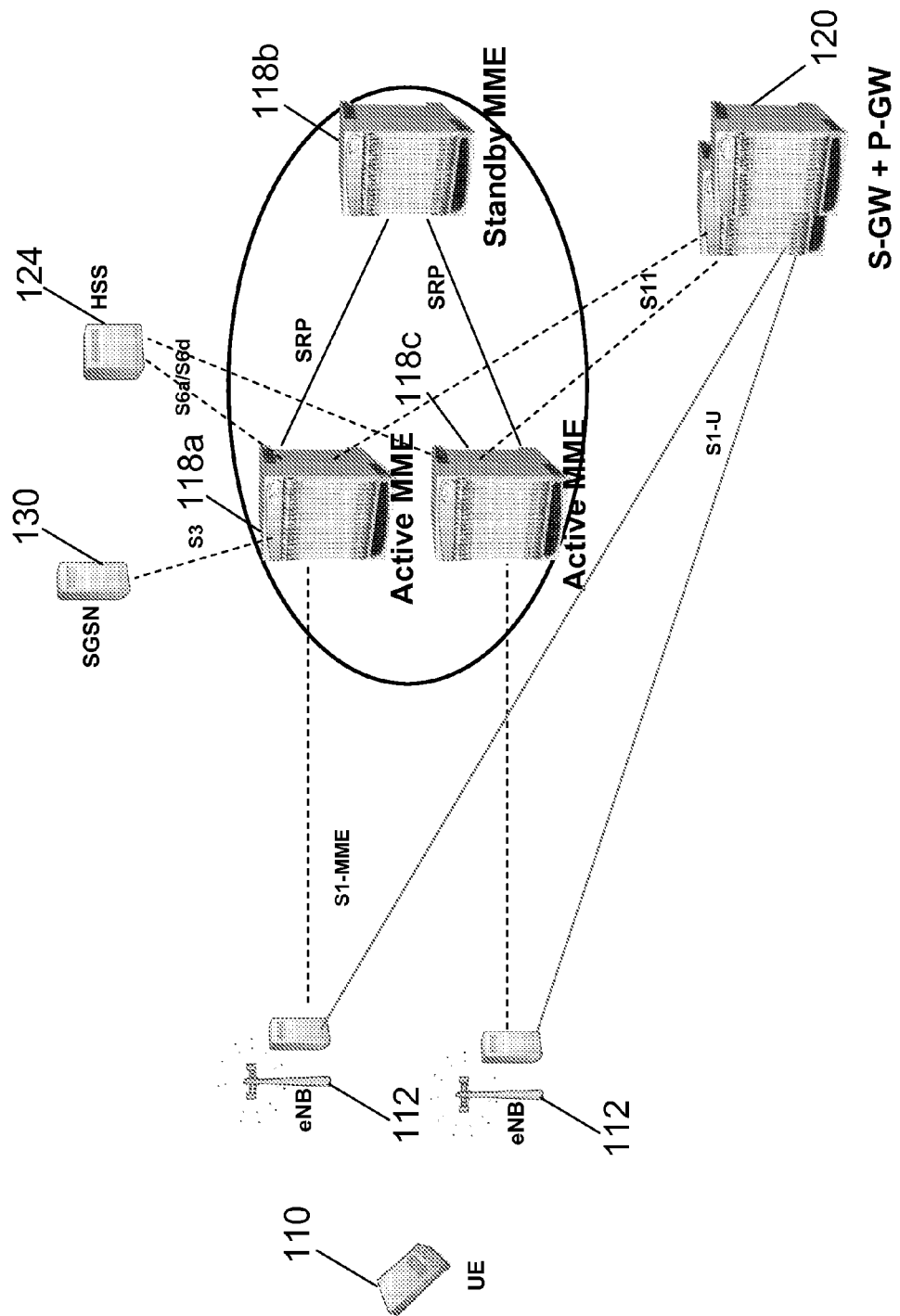
FIG. 2 illustrates a network diagram with service redundancy in accordance with certain embodiments.

FIG. 2 illustrates a network diagram with service redundancy in accordance with some embodiments. The MME 118 can be composed of active MMEs 118a and 118c and standby MMEs 118b, for example. In some embodiments, an Active- Standby model is deployed on the chassis, where one chassis serves as an "active" chassis and one or more other chassis serve as a "standby" chassis. This Active-Standby model can also support multiple different "active" chassis being supported by a "standby" chassis. Another approach is to keep a number of chassis active and to switch functions from an active chassis to another active chassis in the event of a failure. An advantage of the Active-Active mode is that the CPUs are utilized in both chassis when both chassis are active, resulting in improved performance throughput, data latency etc. A Service Redundancy Protocol (SRP) can be used to manage the Active-Active mode as well as the Active-Standby mode chassis.

With MME 118a and 118c, a standby MME 118b can provide redundancy to either MME 118a or 118c, or both MMEs. The multiple active MMEs 118a and 118c can send backup information, such as the session states and node-level states to a standby MME. This process of sending backup information can be performed using checkpoint messages. The checkpoint information can be used if one or more of the active-MMEs fail. When there is an active MME failure or other switchover, the standby-MME takes over the function of the failed MME. The switchover can be indicated by a trigger, which can include an indication of failure or an indication of a request to perform a switchover. Some of the information sent in a checkpoint message can be eNodeB connection states (51-AP), eGTP-c (evolved GPRS tunneling protocol-control) node level states, NAS EMM (non-access stratum evolved mobility management) states such as security context, authentication, identities, HSS subscription information, NAS ESM (non-access stratum evolved session management) states such as active PDP connections, bearer states, QoS (quality of service). Inter-chassis service redundancy (ISCR) can hide a MME failure from network elements such as an eNB, a UE, a HSS, and SGW, for example. The failure of an MME can generate a surge of messaging in the evolved packet core (EPC), for example, to recreate the UE's NAS context on a new MME (which can involve authentication and installing new security contexts for example).

In an Active-Standby redundancy system, at least one chassis may be configured in a primary configuration and at least one may be configured in a backup configuration. In FIG. 2, the MME 118a can provide MME services during normal operating conditions. These services include mobility management, management of UE identities and security parameters, non access stratum (NAS) signaling and security, inter CN node signaling for mobility between 3GPP access networks, idle mode UE reachability, tracking area list management, selection functions, roaming, authentication, and bearer management functions. Likewise, the backup MME, MME 118b, can provide MME services during after a switchover occurs. When a chassis that provides MME functionality is providing services it is considered "active," and when the chassis is not providing services it is considered "standby." The chassis can communicate with one another to determine the state of the other MMEs using the existing network infrastructure. In some embodiments, the "standby" chassis may not switch to "active" unless a failure is detected. In other embodiments, the chassis may be switched manually for performing, for example, maintenance or upgrades to one of the MMEs.

In some embodiments, the service redundancy protocol used by the chassis is a networking protocol based on a transfer control protocol (TCP) that can provide a communication channel between an active and a standby chassis. The communication channel may allow the chassis to determine the peer chassis' state, to validate peer chassis' configuration, and to synchronize backup information. In certain embodiments, a service redundancy protocol (SRP) can be implemented as a centralized control/distributed session model with a SRP Manager or VPN Manager handling various aspects of the communication. The SRP Manager can be a single hardware or software process that reads incoming and forms outgoing SRP control messages including a Hello message and various configuration validation messages. The SRP Manager can also be responsible for determining the Active/Standby state of the chassis.

In some embodiments, multiple processes called SRP Session Managers act as distributed agents and communicate backup information to the redundant chassis. The SRP Session Managers on the redundant chassis may be responsible for receiving this information and creating a redundant session for use in the event of a switchover. The SRP Manager can communicate backup information and SRP protocol configuration information to the SRP Session Managers. This information can provide each SRP Session Manager with the ability to contact the remote chassis and synchronize the backup information through the use of service checkpoint messages.

In certain embodiments, SRP Hello Messages are sent by the chassis in a redundant grouping. These messages may be sent at a periodic interval, randomly, or based on conditions configured by an administrator. The Hello Messages can be used to determine the state of the other chassis and to verify communication with the other chassis. In some embodiments, if the Standby chassis has not received a valid SRP Hello Message from an active chassis peer within a dead-interval, the chassis can assume the Active chassis is not functioning, and can transition to Active and begin providing the same services to the network as the former active chassis. A standby chassis or an active can include multiple active "peer" chassis. For example, a standby chassis can be a peer chassis for three active chassis. In the event one or more of the active chassis failed or initiated a switchover, the standby chassis can resume service.

The Hello Message may contain system attributes such as: chassis state, Peer State, Peer Role, Hello Interval, Priority, Priority Tiebreaker, and BGP modifier. The attributes may be appended to a TCP header and the attributes may be sized in terms of bits, and meanings can be assigned to bit combinations according the needs of the network. The chassis state can be the current state of the chassis sending the message. The Peer State can be the last known state of a peer chassis. The Peer Role can be the role configured for the chassis (e.g., active, standby, etc.). The Hello Interval can be a user-set time period between adjacently sent Hello Messages. The Priority can be a weight assigned to a chassis for use in operation. The Priority Tiebreaker can be a second attribute used to determine which chassis should transition to Active in the case of identical priority. The BGP modifier can be an attribute used to determine how to route messages from border gateway protocol (BGP) router.

In some embodiments, there are SRP Configuration Validation Messages. The Active chassis sends the SRP Configuration Validation Message to the Standby chassis. These messages may contain configuration information that allows the Standby chassis to determine if it is properly configured to assume the role of Active chassis. The SRP Configuration Validation Message may allow for configuration error checking, and verification that the peer chassis is compatible. If an error is determined to exist, the Standby chassis can produce an alarm so that the network operator is notified of the potential problem. The chassis may also maintain a configuration conflict notification mechanism to identify potential problems between peer chassis to an operator before a switching event occurs.

The SRP Configuration Validation Messages may contain attributes such as: Message Type, chassis Configuration, and chassis State. The Message Type can be the category of configuration message. Some examples of categories of configuration messages are loopback interface configuration, IP pool configuration, IP Address, and chassis Service configuration. The chassis Configuration can be the configuration parameters for the selected category of message. The chassis State can be the current state of the chassis sending the message.

In certain embodiments, there are SRP Service Checkpoint Messages. The Checkpoint Messages include backup information. The backup information can include data that may describe each subscriber session being processed by the Active chassis and can contain fields to indicate which session the data pertains and whether to overwrite a session already stored on the Standby chassis. The backup information for a chassis implementing an MME can include session states and node-level states. The Checkpoint Messages can create/delete redundant sessions on the Standby chassis. The Checkpoint Messages may contain all the information needed to recreate a session on the Standby chassis if the Standby chassis were to transition to an Active chassis. The session can be implemented to organize and process data and information relating to a UE or mobile node. The session can be implemented in software using data structures to store and organize information in the network and can include management functions that direct processing of packets that are sent to and received from a UE. Another Checkpoint Message may be used to invalidate an existing session (i.e., this message is sent to the Standby chassis when a call is terminated on the Active chassis).

In some embodiments, the active and standby chassis are configured with common loopback interface routes or addresses. If the chassis is providing gateway functionality such as a P-GW or GGSN, IP Pool information may also be shared among peer chassis. The chassis services run on these loopback interface routes. The loopback routes may be advertised throughout the IP routing domain, in certain embodiments, through the use of a dynamic routing protocol on the Active chassis. The loopback interface routes or loopback addresses are circuitless IP addresses that are not associated with a particular interface or route in some embodiments. In the event of a failure, for example, the Standby chassis transitions to Active and begins advertising the loopback routes or address information of the formerly Active chassis. This may allow other elements in the network to transition to communicating with the previously Standby chassis without service interruption. In other embodiments, layer 2 redundancy can be used with the chassis residing in the same subnet. In a layer 2 embodiment, a floating IP address and an ARP (address resolution protocol) mechanism can also be used to provide service redundancy without external network entities knowing a change has occurred.

Figures 3, 4:
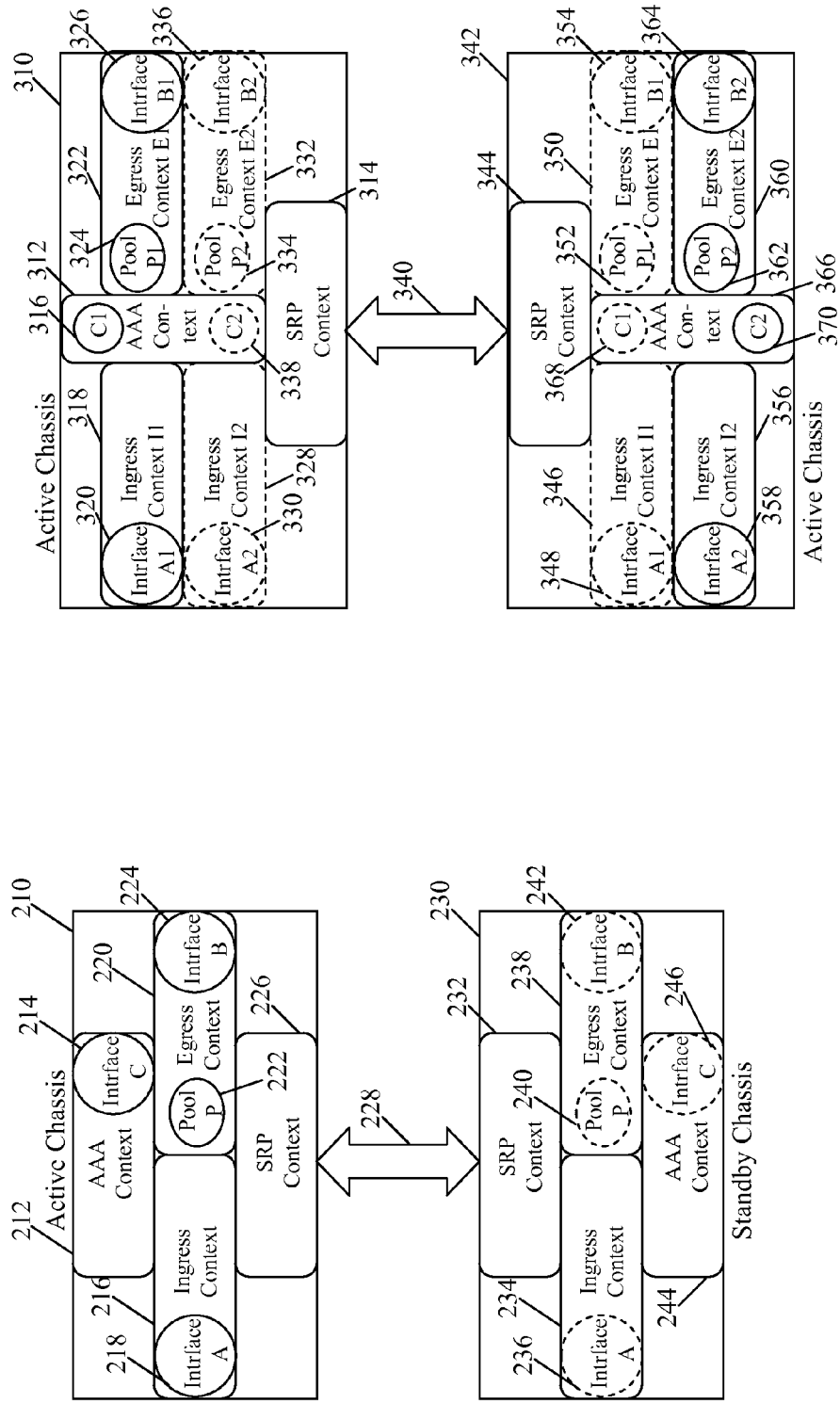
FIG. 3 illustrates chassis with an active-standby implementation in accordance with certain embodiments.
FIG. 4 illustrates chassis with an active-active implementation in accordance with certain embodiments.

FIG. 3 illustrates a software configuration schematic for active-standby redundancy in accordance with certain embodiments. Active chassis 210 includes an AAA context 212, an interface C 214, an ingress context 216, an interface A 218, an egress context 220, an IP pool P 222, an interface B 224, and a service redundancy protocol (SRP) context 226. SRP communications can occur over a communication link 228, which can be a dedicated communication path or a path through the network in which active chassis 210 resides. Illustrated communication link 228 links active chassis 210 to standby chassis 230. Standby chassis 230 includes a SRP context 232, an ingress context 234, an interface A 236, an egress context 238, a IP pool P 240, an interface B 242, an AAA context 244, and an interface C 246.

Both active and standby chassis have "SRP-Activated" resources defined. These resources can be the same between active and standby chassis. Loopback IP addresses in ingress, egress, and AAA contexts as well as IP pools in egress contexts are usually "SRP-Activated" resources. A context is virtual IP network and also a logical partition that is developed in software to allow an IP network to be abstracted from the hardware on which it is implemented. In a chassis, which can have more than one processor and other resources, a context allows a distribution of the hardware resources without dedicating specific physical hardware to a function. In some embodiments, only active chassis enables the "SRP-Activated" resources and the standby chassis keeps the "SRP-Activated" resources disabled until the standby chassis transitions to an active state.

Context services, such as gateway services, can be configured and bound to "SRP-Activated" loopback addresses in the ingress context. The egress context can be used for IP pool configuration. AAA context can be used for RADIUS and subscriber domain configuration. SRP context can be used for configuring SRP IP address and other related parameters. In certain embodiments, ingress and egress contexts may be same context. Also AAA context can be same as ingress or egress context. Typically, though, the SRP context is a separate context.

Ingress context 216 has loopback interface A 218 defined, which is activated and providing one or more mobile nodes with service. Gateway or MME service A is bound to this interface in some embodiments. Standby chassis 230 has the same interface (i.e., interface A 236) and service defined, but are not activated. An interface and service are enabled only in one active chassis at any time. Interface B 224 is defined in egress context 220, which is activated in active chassis 210. Interface C 214 can also be a SRP-activated interface. When active chassis 210 fails, standby chassis 230 becomes active and enables SRP activated IP interfaces (and possibly IP pools), so that standby chassis 230 can function as an active chassis 210 without disrupting the sessions running on the chassis. IP pool P is an IP address pool and each pool has a range of IP address for subscriber assignment for chassis in embodiments that provide gateway functionality as well. In certain embodiments, the ranges can overlap.

In some embodiments, Active-Active chassis redundancy involves grouping resources into at least two different partitions within a chassis. These partitions are known as geographic redundancy (GR) partitions. There are two partitions within the chassis for the purposes of this example, GR partition 1 and GR partition 2 (although more can be used). SRP activated resources belong to one of the partitions and each partition can have service(s) and AAA context/interface defined.

To simplify the configuration, each context with at least one SRP activated resource may be configured for either GR partition 1 or GR partition 2. Another possibility is to configure each SRP activated resource specifically into either one of the partitions. In some embodiments, SRP activated resources and partition configurations of the resources are the same between the chassis, except for the priority and primary/backup mode, which are discussed later. At any time, a particular GR partition is active in only one chassis, according to some embodiments. The corresponding GR partition remains in a standby state in another chassis.

In an example where two chassis are used, when both Active-Active chassis are running in load sharing mode, a first chassis activates GR partition 1 and a second chassis activates GR partition 2. The first chassis GR partition 2 and the second chassis GR partition 1 are in standby mode as described above. When either of the chassis fail or detect AAA Server or peer routing gateways are not reachable, the other chassis takes ownership of both GR partitions in some embodiments. That is, if active GR partition 1 on the first chassis fails, for example, standby partition 1 on the second chassis is activated and handles the subscriber sessions.

FIG. 4 illustrates a software configuration schematic for active-active redundancy in accordance with certain embodiments. Active chassis 310 includes GR partition 1 and GR partition 2 as well as AAA context 312 and SRP context 314. GR partition 1 includes interface C1 314, ingress context I1 318, interface A1 320, egress context E1 322, pool P1 324, and interface B1 326. GR partition 2 includes ingress context I2 328, interface A2 330, egress context E2 332, pool P2 334, interface A2 336, and interface C2 338. SRP communications can occur over a communication link 340, which can be a dedicated communication path or a path through the network in which active chassis 310 resides. Illustrated communication link 340 links active chassis 310 to active chassis 342.

Active chassis 342 also includes a GR partition 1 and a GR partition 2 along with a SRP context 344 that receives communication on communication link 340. GR partition 1 of active chassis 342, in this example, corresponds to active GR partition 1 of active chassis 310. GR partition 1 of active chassis 342 is in a standby state to assume the session load of GR partition 1 of active chassis 310 should it fail. GR partition 1 of active chassis 342 includes ingress context I1 346, interface A1 348, egress context E1 350, Pool P1 352, and interface B1 354. GR partition 2 of active chassis 342 corresponds to GR partition 2 of active chassis 310, which is in a standby state with GR partition 2 of active chassis 342 handling the session loads. GR partition 2 includes ingress context I2, interface A2 358, egress context E2 360, Pool P2 362, and interface B2 364. Active chassis 342 also includes an AAA context 366 which includes a context C1 368 relating to GR partition 1 and a context C2 370 relating to GR partition 2.

Ingress context I1 and egress context E1 belong to geographical redundancy (GR) partition 1. Ingress context I2 and egress context E2 belong to GR partition 2. The first chassis has geographical redundancy partition 1 activated and the second chassis has GR partition 2 activated. This means service A1 is active in the first chassis and service A2 is active in the second chassis. AAA context is same for both of the partitions in this embodiment. AAA context interface C1 belongs to GR partition 1 and AAA context interface C2 belongs to GR partition 2. Some chassis configurations may use a single AAA context. Thus, it may not be possible to have two different AAA contexts for GR partitions. In such cases, two different "SRP Activated" interfaces must be created in the AAA context and assign it as primary and secondary NAS-IP addresses. In some embodiments, one interface is assigned to GR partition 1 and other assigned to GR partition 2. Further, more than one ingress context and services in one GR partition may be used. Also, one GR-partition can have multiple egress contexts.

Figure 5:
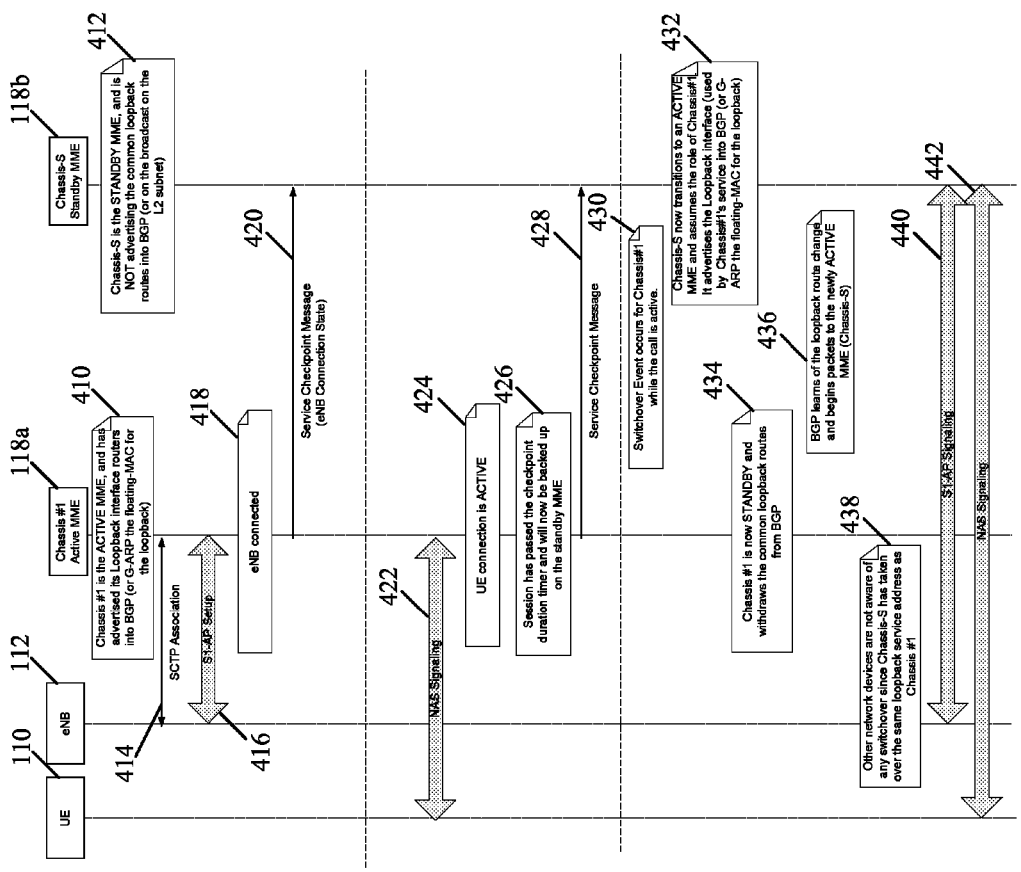
FIG. 5 illustrates a signaling diagram of a switchover in accordance with certain embodiments.

FIG. 5 illustrates a switchover event occurring between chassis in accordance with certain embodiments. The switchover can involve UE 110, eNodeB (eNB) 112, chassis 118a, and chassis-s 118b. While FIG. 5 illustrates an active MME on chassis 118a and a standby MME on chassis-s 118b, other service redundancies may also be implemented on the chassis, for example, a P-GW service redundancy. In 410, chassis 118a is the active chassis with an active MME and has advertised its loopback interface routers into the BGP or gratuitous-address resolution protocol (G-ARP) the floating MAC for the loopback. In 412, chassis-s 118b is the standby chassis with a standby MME, and is withholding its common loopback routes from the BGP or from being broadcast on the L2 subnet. In 414, a transport layer protocol such as stream control transmission protocol (SCTP) is used for communicating between eNB 112 and chassis 118a. The SCTP can be used to provide reliable, in-sequence transport of packet data with congestion control.

In 416, an application layer protocol S1-AP (S1 application protocol) is setup between eNB 112 and chassis 118a to guarantee delivery of signaling messages between the MME and eNB. In 418, the eNB is connected to the active MME on chassis 118a. The eNB connection state can be relayed, in 420, in a service checkpoint message to the standby chassis 118b. In 422, NAS signaling occurs between UE 110 and chassis 118a. In 424, the UE connection is active with packets being exchanged between the UE 110 and the network (not shown). In 426, the chassis 118a determines that the session can be backed up on the standby MME and can include information regarding the session on the next service checkpoint message. In 428, a service checkpoint message is sent from chassis 118a to chassis-s 118b and includes the session information of UE's 110 session.

In 430, a switchover event occurs for chassis 118a while the session is active. In 432, chassis-s 118b transitions to an active state and assumes the role of chassis 118a. Chassis-s 118b advertises using the same addressing and/or routing information as chassis 118a advertised into the network. This can include the loopback interface advertised by chassis 118a into the BGP or G-ARP the floating MAC for the loopback. In 434, chassis 118a is now in a standby state and withdraws the addressing and/or routing information from the network. In 436, the BGP learns of the loopback route change and begins sending packets to the newly active chassis-s 118b. Other network devices are not aware of the switchover since chassis-s 118b used the same loopback service address as chassis 118a in 438. In 440, S1-AP signaling is sent between eNB 112 and chassis-s 118b and in 442 NAS signaling is exchanged between UE 110 and chassis-s 118b.

The G-ARP based implementation is a layer 2 based implementation where the MAC address and IP address of the failed chassis can be assumed by the redundant or standby chassis. In BGP router implementation, routing tables and routes can be updated with advertised information to route messages to the standby router instead of the active router in a switchover event. The layer 2 based implementation can be used in a metro Ethernet to span greater distances than was previously possible. For example, long reach Ethernet (LRE) or Enhanced Ethernet can be used to span longer distances and enable metropolitan area networks (MAN) or even wide area network (WAN) deployments of the redundancy protocol. Both the layer 2 and the BGP router implementation support geographical redundancy, where the chassis are remote from one another and allow a switchover without disruption to the network.

In some embodiments, a plurality of MMEs, which can be implemented on a plurality of chassis, are arranged in a pool. This MME pool allows flexibility in assigning MMEs for a particular session and allows for load balancing among a number of MMEs. However, a disruption can be caused when one of the MMEs in the pool experiences a failure. A redundant MME can provide redundancy to a pool of MMEs to prevent disruptions caused by failure of a MME arranged in a MME pool. For example, a standby MME that is providing redundancy for a MME pool can include information for each MME in the pool and can switch to active if any one MME in the pool experiences a failure.

The chassis described above can implement multiple and different integrated functionalities. In some embodiments, a mobility management entity (MME), a serving gateway (SGW), a PDN gateway (P-GW), an access gateway, a packet data serving node (PDSN), a foreign agent (FA), home agent (HA), a Gateway General packet radio service Serving Node (GGSN), a serving GPRS support node (SGSN), a packet data inter-working function (PDIF), an access service network gateway (ASNGW), mobility access gateway (MAG), an HRPD serving gateway (HSGW), a base station, an access network, a User Plane Entity (UPE), an IP Gateway, an access gateway, a session initiation protocol (SIP) server, a proxy-call session control function (P-CSCF), and an interrogating-call session control function (I-CSCF. In certain embodiments, one or more of the above-mentioned other types of functionalities are integrated together or provided by the same functionality. For example, a MME can be integrated with a SGW. A chassis can include multiple functionalities all running at the same time including a MME, SGW, P-GW, a SIP server, a CSCF, an access gateway, or any other applicable access interface device.

The chassis can also support sessions originated from a Femto base station, which would connect to the gateway through a broadband network. A person or corporation may use a Femto base station in a home or business to support one or more mobile subscribers. The chassis can provide trigger based traffic management during a handoff from a Femto base station to a WiMAX or other macro base station, while maintaining traffic management for the mobile node. In certain embodiments, a chassis is provided by Starent Networks, Corp. of Tewksbury, Mass. in a ST16 or a ST40 multimedia platform.

Figure 6:
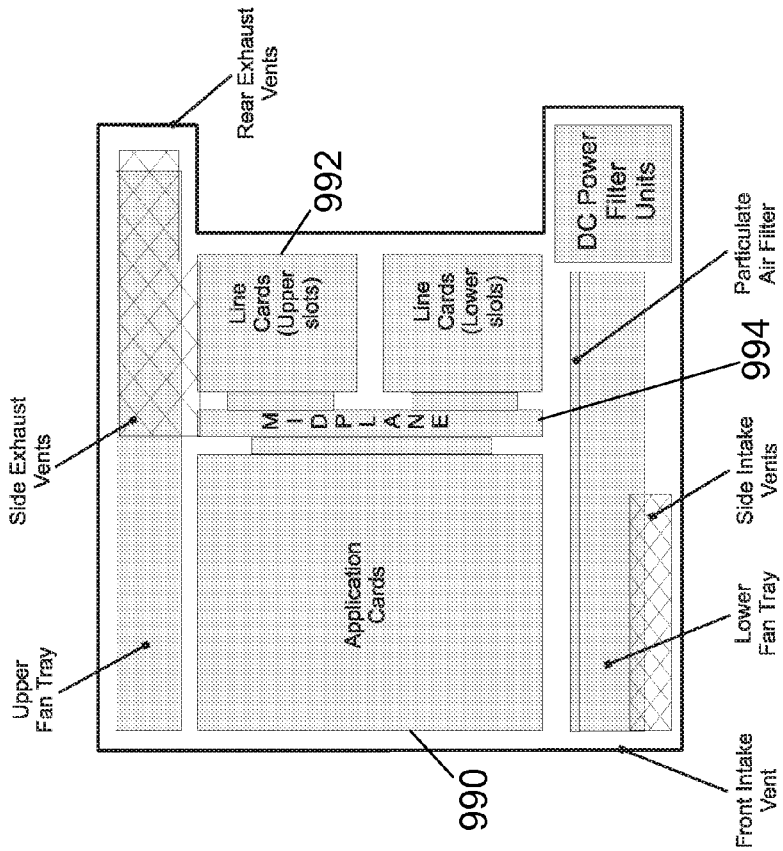
FIG. 6 illustrates a chassis in accordance with certain embodiments.

The features of a chassis that implements a gateway, in accordance with some embodiments, are further described below. FIG. 6 illustrates positioning of cards in the chassis in accordance with some embodiments. The chassis includes slots for loading application cards 990 and line cards 992. A midplane 994 can be used in the chassis to provide intra-chassis communications, power connections, and transport paths between the various installed cards. The midplane 994 can include buses such as a switch fabric, a control bus, a system management bus, a redundancy bus, and a time division multiplex (TDM) bus. The switch fabric is an IP-based transport path for user data throughout the chassis implemented by establishing inter-card communications between application cards and line cards. The control bus interconnects the control and management processors within the chassis. The chassis management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The chassis supports at least four types of application cards: a switch processor card, a system management card, a packet service card, and a packet accelerator card. The switch processor card serves as a controller of the chassis and is responsible for such things as initializing the chassis and loading software configurations onto other cards in the chassis. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations. The system management card is a system control and management card for managing and controlling other cards in the gateway device. The packet services card is a high-speed processing card that provides mutli-threaded point-to-point, packet data processing, and context processing capabilities, among other things.

The packet accelerator card performs packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the chassis provide input/output connectivity and can also provide redundancy connections as well.

The operating system software can be based on a Linux software kernel and run specific applications in the chassis such as monitoring tasks and providing protocol stacks. The software allows chassis resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a P-GW, SGW, PDSN, ASNGW, PDIF, HA, GGSN, or IPSG).

The chassis' software can be divided into a series of tasks that perform specific functions. These tasks communicate with each other as needed to share control and data information throughout the chassis. A task is a software process that performs a specific function related to system control or session processing. Three types of tasks operate within the chassis in some embodiments: critical tasks, controller tasks, and manager tasks. The critical tasks control functions that relate to the chassis' ability to process calls such as chassis initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a chassis include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the chassis by monitoring the various software and hardware components of the chassis. Recovery control task subsystem is responsible for executing a recovery action for failures that occur in the chassis and receives recovery actions from the high availability task subsystem. Shared configuration task subsystem provides the chassis with an ability to set, retrieve, and receive notification of chassis configuration parameter changes and is responsible for storing configuration data for the applications running within the chassis. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the chassis, which include creating separate VPN contexts, starting IP services within a VPN context, managing IP pools and subscriber IP addresses, and distributing the IP flow information within a VPN context. In some embodiments, within the chassis, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In some embodiments, the software needed for implementing a process or a database includes a high level procedural or an object-orientated language such as C, C++, C#, Java, or Perl. The software may also be implemented in assembly language if desired. Packet processing implemented in a chassis can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow. Other embodiments are within the following claims. For example, a chassis can implement inter-chassis redundancy between P-GW functionalities.

We claim:

1. A method of providing geographic redundancy from a MME implemented on a chassis to a plurality of remote mobility management entities (MME), the method comprising:
   receiving, at the MME, a configuration message from a first remote MME, which is used by the MME to configure the MME to provide geographic redundancy to the first remote MME;
   receiving, at the MME, a configuration message from a second remote MME, which is used by the MME to configure the MME to provide geographic redundancy to the second remote MME;
   receiving, at the MME, from the first remote MME, backup information that corresponds to active sessions on the first remote MME;
   receiving, at the MME, from the second remote MME, backup information that corresponds to active sessions on the second remote MME;
   creating, at the MME, redundant sessions corresponding to the sessions on the first remote MME and the second remote MME using the backup information received from the first remote MME and the second remote MME;
   activating the redundant sessions on the MME for at least one of the first remote MME and the second remote MME when the MME detects a trigger from at least one of the first remote MME and the second remote MME; and
   exchanging control signaling at the MME with at least one eNodeB and at least one serving gateway (SGW), wherein the MME takes over providing evolved mobility management and evolved session management in place of the at least one of the first remote MME and the second remote MME using the activated redundant sessions.

2. The method of claim 1, wherein the trigger includes at least one of: an indication that a remote MME has failed, and an indication from the first remote MME to the MME to initiate a switchover.

3. The method of claim 1, wherein the MME resides on a chassis that includes line cards for input/output connectivity and application cards that provide functionalities including system control and management as well as packet processing.

4. The method of claim 3, further comprising:
   executing, by a recovery control task, a recovery action for failures that occur in the chassis; and
   transporting user data over a redundancy link when a hardware failure occurs in the chassis.

5. The method of claim 3, further comprising receiving, at a SGW function implemented on the chassis, packet data addressed to the SGW function, wherein the SGW function and the MME are implemented on the chassis.

6. The method of claim 1, wherein the MME includes active and standby partitions and the MME provides standby partitions for at least the first remote MME and the second remote MME.

7. The method of claim 1, further comprising broadcasting from the MME common loopback interface routes into at least one of a border gateway protocol (BGP).

8. The method of claim 7, further comprising receiving control signaling addressed to the first remote MME at the MME after broadcasting the common loopback interface routes.

9. The method of claim 1, further comprising exchanging with the first remote MME and the second remote MME a periodic service redundancy message that is used to determine when a failure occurs and trigger a switchover.

10. The method of claim 1, wherein the background information includes eNodeB connection states, node level states, evolved mobility management states, and evolved session states.

11. A mobility management entity (MME) that communicates with at least one remote MME to provide redundancy in case of failure, the MME comprising:
   a service redundancy protocol (SRP) manager of the MME that provides redundancy to a remote MME, and where the SRP manager is configured to read incoming and form outgoing SRP control messages exchanged with the remote MME, wherein the SRP messages received include backup information for sessions on the remote MME;
   a SRP session manager of the MME configured to communicate with the SRP manager to receive the backup information obtained from the remote MME and create redundant sessions that correspond to active sessions on the remote MME, wherein the redundant sessions are updated to allow the MME to activate the redundant sessions to provide MME functionality in place of the remote MME; and
   wherein the MME is configured to transmit control signaling to at least one eNodeB and at least one serving gateway (SGW) after a trigger is detected by the SRP manager and a switchover is initiated.

12. The MME of claim 11, wherein the trigger includes at least one of: an indication of a failure of the remote MME, and an indication from the remote MME to the MME to initiate a switchover.

13. The MME of claim 11, wherein the MME includes active and standby partitions, wherein the standby partitions correspond to an active partition on the remote MME.

14. The MME of claim 11, further comprising:
   at least one line card configured to provide input/output connectivity;
   at least one application card configured to provide functionalities including system control and management and packet processing;
   a bus for coupling the at least one line card and the at least one application card in a chassis; and
   a recovery control task residing on the at least one application card, and providing a recovery action for failures that occur in the chassis; and
   a redundancy link coupled to the at least one application card and configured to transport data when a hardware failure occurs in the chassis.

15. The MME of claim 11, wherein the background information includes eNodeB connection states, node level states, evolved mobility management states, and evolved session states.

16. A chassis that implements a mobility management entity (MME) function and communicates with at least one remote chassis that implements a second MME function, the chassis comprising:
   a service redundancy protocol (SRP) manager implemented by the chassis to provide redundancy to a plurality of remote chassis each implementing a MME, and where the SRP manager is configured to read incoming SRP control messages received from the plurality of remote chassis that include backup information on one of the plurality of remote chassis implementing a MME function;
   a SRP session manager implemented by the chassis and configured to communicate with the SRP manager to receive backup information obtained from at least one of the plurality of remote chassis and create redundant sessions that correspond to active sessions on the at least one of the plurality of remote chassis, wherein the redundant sessions are updated to allow the chassis to activate the redundant sessions to provide MME functionality in place of an MME function residing on one of the plurality of remote chassis; and
   a physical interface on the chassis configured to transmit control signaling from the MME function to at least one eNodeB and at least one serving gateway (SGW) after a trigger is detected by the SRP manager and a switchover is initiated.

17. The chassis of claim 16, wherein the trigger includes at least one of: an indication of a failure of the one of the plurality of remote chassis, and an initiation from the one of the plurality of remote chassis to the chassis to initiate a switchover.

18. The chassis of claim 16, further comprising:
   at least one line card configured to provide input/output connectivity;
   at least one application card configured to provide functionalities including system control and management as well as packet processing; and
   a bus for coupling the at least one line card and the at least one application card in the chassis.

19. The chassis of claim 18, further comprising:
   a recovery control task residing on the at least one application card, and providing a recovery action for failures that occur in the chassis; and
   a redundancy link coupled to the at least one application card and configured to transport data when a hardware failure occurs in the chassis.

20. The chassis of claim 16, wherein the chassis includes active and standby partitions for the MME and the chassis provides standby partitions for the plurality of remote chassis MME functions.

21. The chassis of claim 16, wherein the chassis is configured to broadcast common loopback interface routes into at least one of a border gateway protocol (BGP) for the MME after the trigger is detected.

22. The chassis of claim 16, further comprising a SGW function implemented on the chassis that is configured to receive packet data from a PDN gateway (PGW) addressed to the SGW function and send the packet data to an eNodeB.

23. The chassis of claim 16, wherein the background information includes eNodeB connection states, node level states, evolved mobility management states, and evolved session states.

* * * * *